(12) United States Patent
Araki et al.

(10) Patent No.: US 6,661,579 B2
(45) Date of Patent: Dec. 9, 2003

(54) BEAM SPLITTING FOR CAMERA USING A MULTILAYER FILM

(75) Inventors: Kiyoshi Araki, Kanagawa-ken (JP); Taku Ito, Tokyo (JP); Isao Okuda, Saitama-ken (JP); Masahiro Oono, Saitama-ken (JP); Moriyasu Kanai, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/772,967

(22) Filed: Jan. 31, 2001

(65) Prior Publication Data

US 2001/0033423 A1 Oct. 25, 2001

(30) Foreign Application Priority Data

Jan. 31, 2000 (JP) .......................................... 2000-021037
Jan. 31, 2000 (JP) .......................................... 2000-021038

(51) Int. Cl.[7] .......................... G02B 27/14; H04N 5/225
(52) U.S. Cl. ........................ 359/629; 359/638; 348/341
(58) Field of Search ................................ 359/834, 636, 359/638, 629, 625, 618; 348/337, 341

(56) References Cited

U.S. PATENT DOCUMENTS

| | | | | |
|---|---|---|---|---|
| 4,641,926 A | * | 2/1987 | Shirasaki | 359/629 |
| 4,853,787 A | * | 8/1989 | Kurth | 348/341 |
| 5,893,653 A | | 4/1999 | Abe | |
| 6,317,264 B1 | * | 11/2001 | Li et al. | 359/629 |

FOREIGN PATENT DOCUMENTS

JP           362187802 A  *  8/1987 ............ G02B/5/28

* cited by examiner

*Primary Examiner*—Ricky Mack
*Assistant Examiner*—Alicia Harrington
(74) *Attorney, Agent, or Firm*—Greenblum & Bernstein, P.L.C.

(57) ABSTRACT

A beam splitter for a digital camera splits light passed through a photographing lens into beams directed to a CCD and a finder optical system. The beam splitter includes at least one optical element provided with a beam splitting surface that is inclined with respect to an optical axis of the photographing lens, and a multi-layer film including a plurality of layers of dielectric materials is formed on the beam splitting surface. The multi-layer film is configured such that the beam splitting surface exhibits a substantially constant reflectivity at least for visible light that is incident on the beam splitting surface at any incident angle within a predetermined range.

7 Claims, 6 Drawing Sheets

BEAM SPLITTING FOR CAMERA USING A MULTILAYER FILM

BACKGROUND OF THE INVENTION

The present invention relates to a beam splitting element for a single reflex lens digital camera.

Recently, digital cameras have become widely used instead of cameras using silver-salt films. Among such digital cameras, an SLR (single lens reflex) type digital camera is advantageous since the image of the object formed by the photographing lens of the camera is observed through the finder, no parallax is generated between the image captured by an image capturing element such as a CCD (Charge Coupled Device), and the image observed through the finder.

An example of the SLR digital camera is provided with a beam splitter which splits light passed through the photographing lens into light directed to the image capturing element and light directed to the finder optical system. The beam splitter includes a beam splitting surface (i.e., a half mirror surface), which may be formed with a multi-layer film or coating made of dielectric material. The multi-layer film is generally designed to exhibit optimum reflecting/transmitting characteristics for the visible light, whose wavelength range is, for example, approximately from 400 nm to 700 nm.

Figure 1:
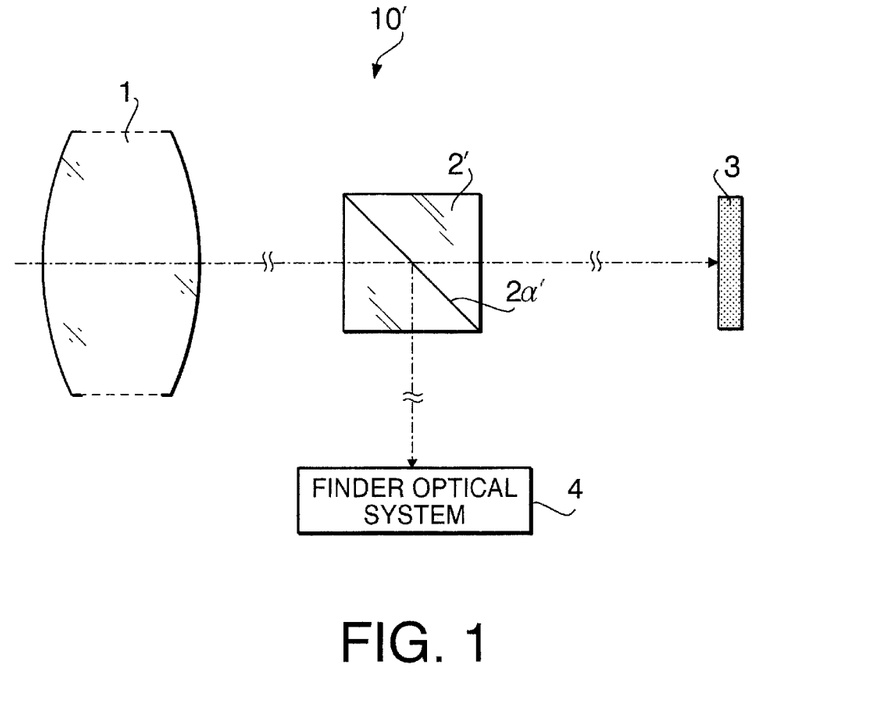
FIG. 1 shows an example of a conventional photographing optical system.

FIG. 1 shows an example of a conventional photographing optical system 10' for an SLR digital camera employing a beam splitting element 2' and a CCD 3. The beam splitter 2' is provided with a half mirror surface 2α'. The half mirror surface 2α' is provided with a multi-layer film which is designed to have an optimum reflectivity (e.g., 30%) for the visible light incident thereon at a predetermined incident angle (e.g., 45°).

Figure 2:
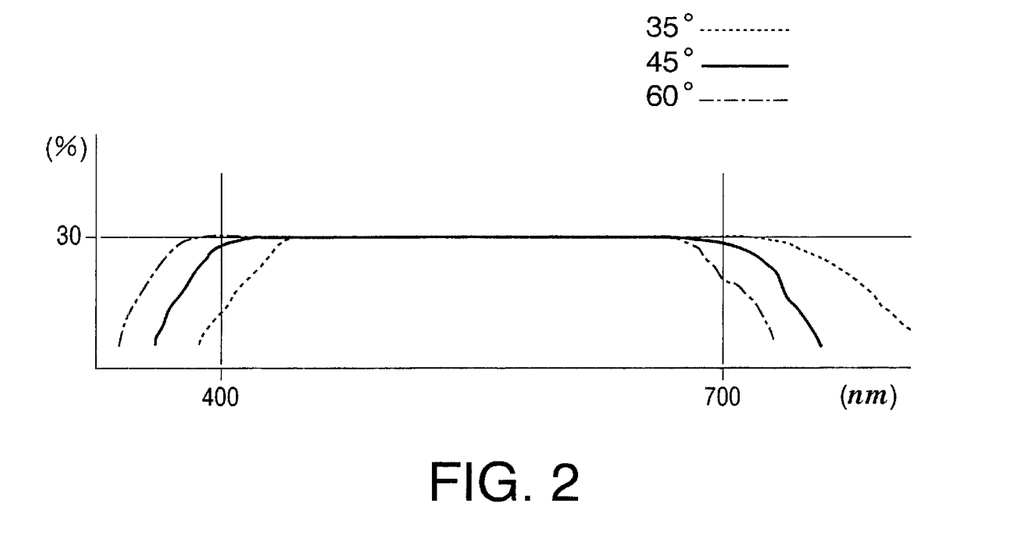
FIG. 2 shows a graph indicating a relationship between the reflectivity with respect to the wavelength of a beam incident on the half mirror.

FIG. 2 shows a graph indicating a relationship between the reflectivity with respect to the wavelength of a beam incident on the half mirror 2α' at the incident angles of 45° and (45±10)°.

As shown in FIG. 2, when the incident angle of the beam is 45°, the beam is reflected at the reflectivity of 30% substantially at any wavelength within the visible range (i.e., 400 nm through 700 nm). However, light from the object includes a beam which is inclined with respect to the optical axis of the photographing optical system. Generally, the incident angle of such a beam with respect to the half mirror surface 2α' is within a range approximately from 35° to 55°. The characteristics of the beams incident on the half mirror surface 2α' at the incident angles of 35° and 55° are also indicated in FIG. 2. As shown in FIG. 2, the reflectivity characteristics vary depending on the incident angle. Specifically, when the incident angle is lowered with respect to a designed angle (i.e., 45°0), the characteristic shift in the longer wavelength side (i.e., right-hand side in FIG. 2), while if the incident angle increases, the characteristic shift in the shorter wavelength side. If a wavelength range corresponding to the maximum reflectivity (i.e., 30% in FIG. 2) shifts as the incident angle changes, the color of an object cannot be captured accurately. For example, if the incident angle decreases, components having shorter wavelengths (e.g., 400 nm) are reflected by the half mirror surface 2α' at a lower reflectivity. Accordingly, the reflected light includes less lower-wavelength components than the light from the object. This also causes the light transmitted through the half mirror surface 2α' to include more lower-wavelength components. Similarly, if the incident angle increases, components having longer wavelengths (e.g., 700 nm) are reflected at a lower reflectivity. In such a case, the reflected light includes less higher-wavelength components than the light from the object, and the light transmitted through the half mirror surface 2α' includes more higher-wavelength components than the light from the object. If such a phenomenon occurs, a part of an image captured by the CCD and/or observed through the finder appears reddish or bluish, which is different from the color of the object viewed by the naked eyes.

Conventionally, for the image captured by the CCD, an improved image processing system is provided in the digital camera to compensate for the shift of the reflectivity characteristics so that the change of the color of the image captured by the CCD and displayed on an LCD is not conspicuous. However, such a high-performance image processing system increases the manufacturing cost. Further, since a longer image processing time duration is required, movement of the object may not be viewed in real time through the LCD.

Further, with respect to the image observed through the finder, since the optical image is directly viewed, the image cannot be compensated. Thus, the operator is required to observe the image including the above-described defects, which may cause the operator to feel uncomfortable.

SUMMARY OF THE INVENTION

It is therefore an object of the invention to provide an improved beam splitting element which retains a predetermined reflectivity characteristic for the visible light including components having predetermined incident angle range.

For the above object, according to the invention, there is provided a beam splitter for a digital camera for capturing an image of an object using an image capturing element, the beam splitter splitting light passed through a photographing lens of the camera into a beam directed to the image capturing element and a beam directed to a finder optical system of the camera, which is provided with at least one optical element provided with a beam splitting surface that is inclined with respect to an optical axis of the photographing lens, and a multi-layer film formed on the beam splitting surface, the multi-layer film including a plurality of layers of dielectric materials, the multi-layer film being formed such that the beam splitting surface of the at least one optical element exhibits a substantially constant reflectivity at least for visible light that is incident on the beam splitting surface at any incident angle within a predetermined range.

With this structure, all the beams incident on the beam splitting surface are split thereby at a substantially same ratio, and therefore the defects in the conventional beam splitter can be overcome.

Optionally, the multi-layer film may be formed such that a layer of a dielectric materials having a relatively high refractive index and a layer of a dielectric material having a relatively low refractive index are alternately layered. In particular, the low refractive index may be defined to fall within a range from 1.30 to 1.66, and the high refractive index may be defined to fall within a range from 1.90 to 2.50.

In a specific structure, the at least one optical element comprises first and second right-angle prisms arranged from a photographing lens side, inclined surfaces of the first and second prisms being adhered to each other with the multi-layer film sandwiched therebetween, the inclined surface of the second prism being the beam splitting surface.

In the above structure, the multi-layer film may be formed such that the beam splitting surface exhibits a substantially constant reflectivity for light whose wavelength is within a range broader than the wavelength range of the visible light in either a lower wavelength direction or a higher wavelength direction, and which light is incident on the beam splitting surface at a predetermined incident angle.

Optionally, the multi-layer film may include at least two types of dielectric layers respectively having a relatively low refractive index and a relatively high refractive index, the two types of dielectric layers being alternately layered.

Also in this case, the low refractive index may fall within a range from 1.30 to 1.66, and the high refractive index may fall within a range from 1.90 to 2.50.

In a specific example, the multi-layer film includes six layers L1–L6 respectively having the low refractive indexes and seven layers H1–H7 respectively having the high refractive indexes. The layers L1–L6 and H1–H7 are arranged, from the light incident side, in the order of H1, L1, H2, L2, H3, L3, H4, L4, H5, L5, H6, L6 and H7, and a quarter-wavelength optical thickness (QWOT) of each of the layers H1–H7 and L1–L7 is defined as follows:

143 nm<QWOT of H1<175 nm;
172 nm<QWOT of L1<211 nm;
1304 nm<QWOT of H2<1594 nm;
182 nm<QWOT of L2<223 nm;
204 nm<QWOT of H3<249 nm;
463 nm<QWOT of L3<565 nm;
928 nm<QWOT of H4<1134 nm;
450 nm<QWOT of L4<550 nm;
835 nm<QWOT of H5<1021 nm;
464 nm<QWOT of L5<567 nm;
498 nm<QWOT of H6<609 nm;
179 nm<QWOT of L6<218 nm; and
480 nm<QWOT of H7<586 nm.

Optionally, the predetermined range is a range of ±15 degrees with respect to a predetermined angle. The predetermined angle may be 45 degrees, and this may be varied depending on the arrangement of the beam splitter with respect to an optical axis of the photographing lens.

In an another case, the multi-layer film may be arranged on the photographing lens side of the at least one optical element, the photographing lens side of the multi-layer film being exposed to a predetermined medium having a refractive index lower than that of the at least one optical element.

Optionally, the multi-layer film includes at least two types of dielectric layers respectively having a relatively low refractive index and a relatively high refractive index, the two types of dielectric layers being alternately layered.

Also in the above case, the low refractive index may fall within a range from 1.30 to 1.66, and the high refractive index may fall within a range from 1.90 to 2.50.

In a specific example, the multi-layer film includes two layers L1 and L2 respectively having the low refractive indexes and two layers H1 and H2 respectively having the high refractive indexes, the layers H1, L1, H2 and L2 being arranged, in this order, from the light incident side; and wherein a quarter-wavelength optical thickness of each layers H1, H2, L1 and L2 are defined as follows:

566 nm<QWOT of H1<691 nm;
314 nm<QWOT of L1<384 nm;
71 nm<QWOT of H2<87 nm; and
308 nm<QWOT of L2<376 nm.

Optionally, at least one optical element may consist of a single optical element made of glass, and the predetermined medium is the air.

In particular, the single element is a parallel plate.

Alternatively, the single element may be a right-angle prism, the beam splitting surface being provided on an inclined surface of the right-angle prism.

DESCRIPTION OF THE EMBODIMENT

Figure 3:
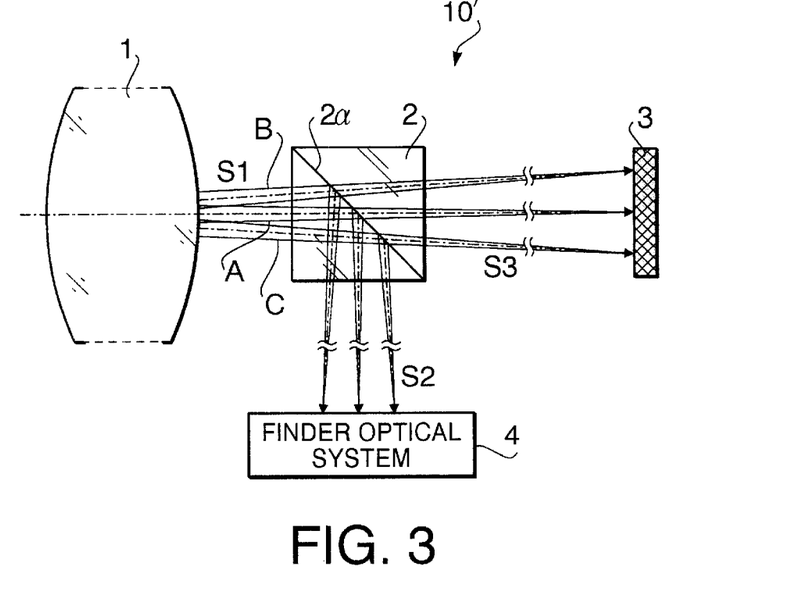
FIG. 3 schematically shows a photographing optical system employing a beam splitter according to a first embodiment of the invention.

FIG. 3 schematically shows a photographing optical system 10 employing a beam splitter 2 according to a first embodiment of the invention.

The photographing optical system 10 includes a photographing lens 1, the beam splitter 2 and a CCD (Charge Coupled Device) 3.

The photographing lens 1 converges light from an object on an image receiving surface of the CCD 3 to form an optical image thereon. Specifically, the light S1 passed through the photographing lens 1 is incident on the beam splitter 2, which splits the incident light S1 into light S2 reflected thereby and directed to a finder optical system 4, and light S3 impinges on the CCD 3. The CCD 3 converts the received optical image into an electric image signal, which is transmitted to an image processing circuit (not shown) of the camera.

Figure 4:
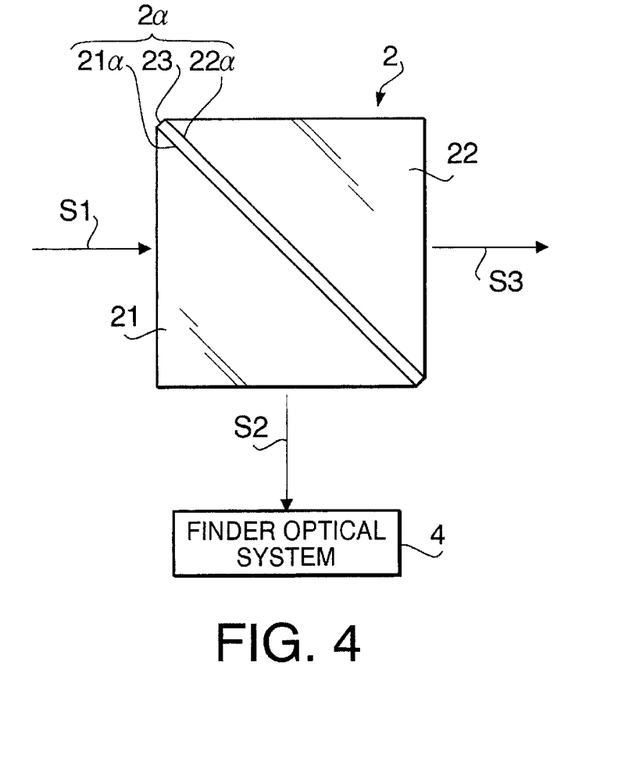
FIG. 4 is an enlarged plan view of the beam splitter employed in the beam splitter shown in FIG. 3.

FIG. 4 is an enlarged plan view of the beam splitter 2. The beam splitter 2 includes a first right-angle prism 21 and a second right-angle prism 22, which are cemented at a cementing portion 2α.

The cementing portion 2α has a multiplayer film 23 sandwiched between inclined surfaces 21α and 22α of the first and second right-angle prisms 21 and 22. The inclined surfaces 21α and 22α are parallel to each other, which are adhered on opposite surfaces of the multi-layer film 23 using predetermined adhesive agent such as one whose refractive index is 1.49. With this structure, the beam splitter 2 has a substantially rectangular-solid shape. As shown in FIG. 4, the right-angle prism 21, the multi-layer film 23 and the right-angle prism 22 are arranged in this order from the object side (i.e., the left-hand side in FIG. 4) to the CCD side (i.e., the right-hand side in FIG. 4).

The multi-layer film 23 includes a plurality of layers. In FIG. 4, the thickness of the multi-layer film 23 is exaggerated, and the actual thickness is much thinner than shown.

The beam splitter 2 is arranged such that the optical axis of the photographing lens 1 and a normal line at a point where the optical axis of the photographing lens 1 intersects with the inclined surface 21α form 45 degrees. With this structure, the beam splitter 2 splits the incident light S1 to the first and second light S2 and S3 at optimum rate.

It should be noted that the light S1 includes not only a component which is parallel with the optical axis of the photographing lens 1 but also components that are inclined with respect to the optical axis. In the following description, for representing such components, three beams A, B and C are described. The beam A is parallel with the optical axis of the photographing lens 1. The beam B is a beam that impinges on the inclined surface 21α at the smallest incident angle (which is assumed to be 35 degrees), and the beam C is a beam that impinges on the inclined surface 21α at the greatest incident angle (which is assumed to be 55 degrees). The beam A forms a central portion of the image, and the beams B and C form peripheral portions of the image on the CCD 3.

In the first embodiment, the multi-layer film 23 is designed such that the reflectivity and transmissivity of the visible light have substantially constant values over the wavelength range of the visible light. For example, the reflectivity is approximately 30%, and the transmissivity is approximately 70%.

Figure 5:
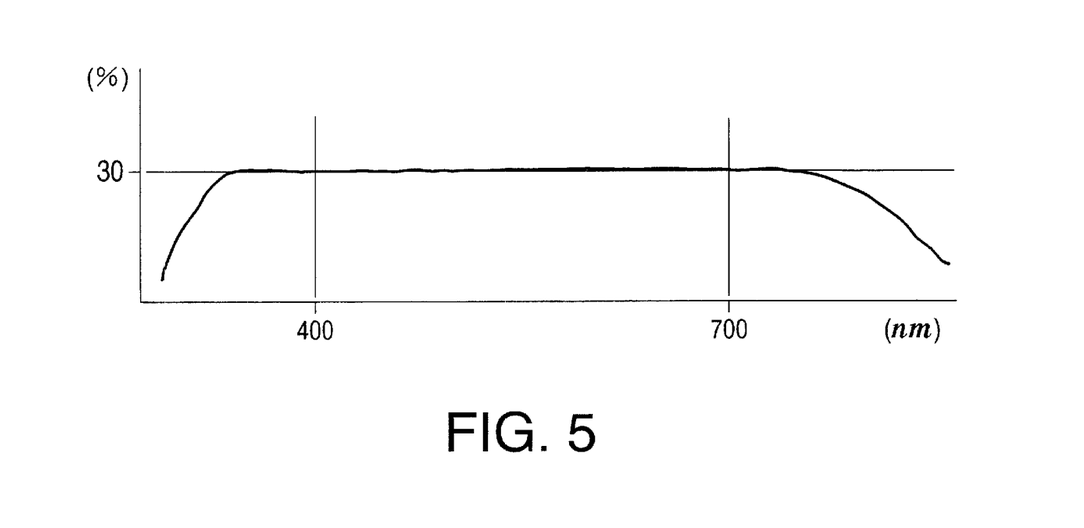
FIG. 5 schematically shows a graph indicating a relationship between the reflectivity of the beam splitter with respect to the wavelength of a beam A.

FIG. 5 shows a graph indicating a relationship between the reflectivity of the beam splitter 2 with respect to the wavelength of the beam A. As understood from FIG. 2 and FIG. 5, the wavelength range, within which the reflectivity is substantially constant, is broadened in FIG. 5. As aforementioned, the reflectivity/transmissivity characteristics shift depending on the incident angle. Since the wavelength range is broadened as shown in FIG. 5 in the first embodiment, even for the beams impinging at different incident angles (i.e., for the beam B or C), substantially the constant reflectivity/transmissivity is obtained within the wavelength range of the visible light (i.e., 400 nm–700 nm). It should be noted that, in the first embodiment, the beams B and C are assumed to be incident on the surface 21α at incident angles of 35° and 55°, respectively.

TABLE 1 shows a layer-structure of the multi-layer film 23.

TABLE 1

| layer | 1 | 2 | 3 | 4 | 5 | 6 | 7 | 8 | 9 | 10 | 11 | 12 | 13 | |
|---|---|---|---|---|---|---|---|---|---|---|---|---|---|---|
| material | $G_{21}$ | H1 | L1 | H2 | L2 | H3 | L3 | H4 | L4 | H5 | L5 | H6 | L6 | H7 | $G_{22}$ |

In TABLE 1, the upper row indicates layer numbers in the order a beam impinges, and the lower row indicates the material of each layer. $G_{21}$ represents the material (i.e., glass) of the right-angle prism 21, and $G_{22}$ represents the material (i.e., glass) of the right-angle prism 22. H1–H7 represent dielectric materials having relatively high refractive indexes and L1–L6 represent dielectric material having relatively low refractive indexes. The materials H1–H7 need not be the same material, and the materials L1–L6 need not be the same material. If the refractive indexes of the materials H1–H7 are represented by $n_{Hj}$ (j=0, 1, 2, . . . , and 7), and the refractive indexes of the materials L1–L6 are indicated by $n_{Lk}$ (k=0, 1, . . . , 6), the following relationships should be satisfied.

$1.90 < n_{Hj} < 2.50$ $1.30 < n_{Lk} < 1.66$

The thickness (QWOT: Quarter-Wave Optical Thickness) of each layer is defined by the following relationships.

143 nm<QWOT of H1<175 nm 172 nm<QWOT of L1<211 nm 1304 nm<QWOT of H2<1594 nm 182 nm<QWOT of L2<223 nm 204 nm<QWOT of H3<249 nm 463 nm<QWOT of L3<565 nm 928 nm<QWOT of H4<1134 nm 450 nm<QWOT of L4<550 nm 835 nm<QWOT of H5<1021 nm 464 nm<QWOT of L5<567 nm 498 nm<QWOT of H6<609 nm 179 nm<QWOT of L6<218 nm 480 nm<QWOT of H7<586 nm

TABLE 2 shows a concrete example satisfying the above relationships.

TABLE 2

| layer | material | index | absorption | QWOT |
|---|---|---|---|---|
| H1 | $Ta_2O_5$ | 2.055 | 0 | 158.76 |
| L1 | $MgF_2$ | 1.388 | 0 | 191.53 |
| H2 | $Ta_2O_5$ | 2.055 | 0 | 1448.94 |
| L2 | $MgF_2$ | 1.388 | 0 | 202.55 |
| H3 | $Ta_2O_5$ | 2.055 | 0 | 226.28 |
| L3 | $SiO_2$ | 1.4693 | 0 | 514.06 |
| H4 | $Ta_2O_5$ | 2.055 | 0 | 1030.96 |
| L4 | $SiO_2$ | 1.4693 | 0 | 500.24 |
| H5 | $Ta_2O_5$ | 2.055 | 0 | 927.75 |
| L5 | $SiO_2$ | 1.4693 | 0 | 515.39 |
| H6 | $Ta_2O_5$ | 2.055 | 0 | 553.86 |
| L6 | $MgF_2$ | 1.388 | 0 | 198.52 |
| H7 | $Ta_2O_5$ | 2.055 | 0 | 532.91 |

In the structure indicated in TABLE 2, tantalum pentoxide ($Ta_2O_5$) is used, for the layers H1–H7, as the dielectric material having the high refractive index. Regarding the materials having the low refractive indexes, magnesium fluoride ($MgF_2$) is used for the layers L1, L2 and L6, and silicon dioxide ($SiO_2$) is used for the layers L3, L4 and L5. In this example, the absorption ratio of the layer is assumed to be zero.

Figure 6:
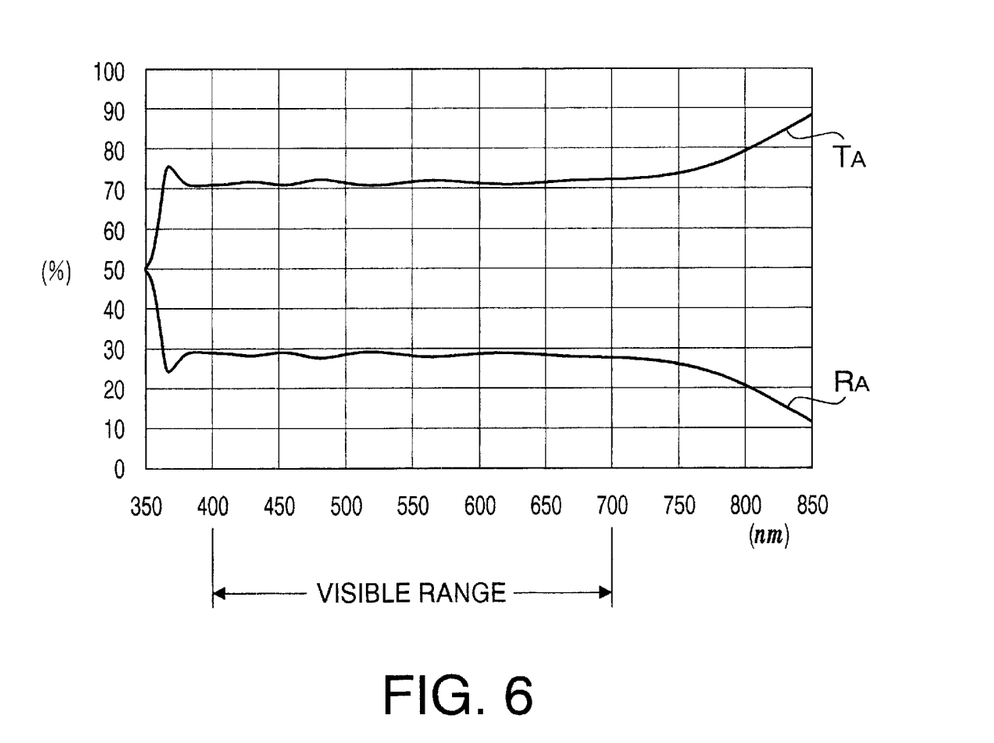
FIG. 6 shows a graph indicating a relationship between the reflectivity/transmissivity of the beam splitter employing the structure indicated in TABLE 2 with respect to the wavelength of the beam A.

FIG. 6 shows a graph indicating a relationship between the reflectivity/transmissivity of the beam splitter employing the structure indicated in TABLE 2 with respect to the wavelength of the beam A. In FIG. 6, TA represents the transmissivity characteristic and RA represents the reflectivity characteristic. As shown in FIG. 6, according to the structure indicated in TABLE 2, the reflectivity/transmissivity remain substantially constant (i.e., approximately 30%/70%) over a broadened wavelength range of approximately from 360 nm to 750 nm, including the range (400 nm–700 nm) of the visible light. When the beam splitter having the characteristics shown in FIG. 6 is employed in the digital camera, approximately 30% of the beam A is reflected by the beam splitter 2 and directed to the finder optical system 4, while approximately 70% of the beam A is incident on the CCD 3. It should be noted that the amount of light directed to the finder optical system 4 is less than that directed to the CCD 3. The ratios are determined in view of the fact that the light directed to the finder optical system is sufficient if it can be used for observing the object through the finder optical system, and that the light directed to the CCD 3 is required to be used for capturing the image (i.e., obtaining the image signal).

Figure 7:
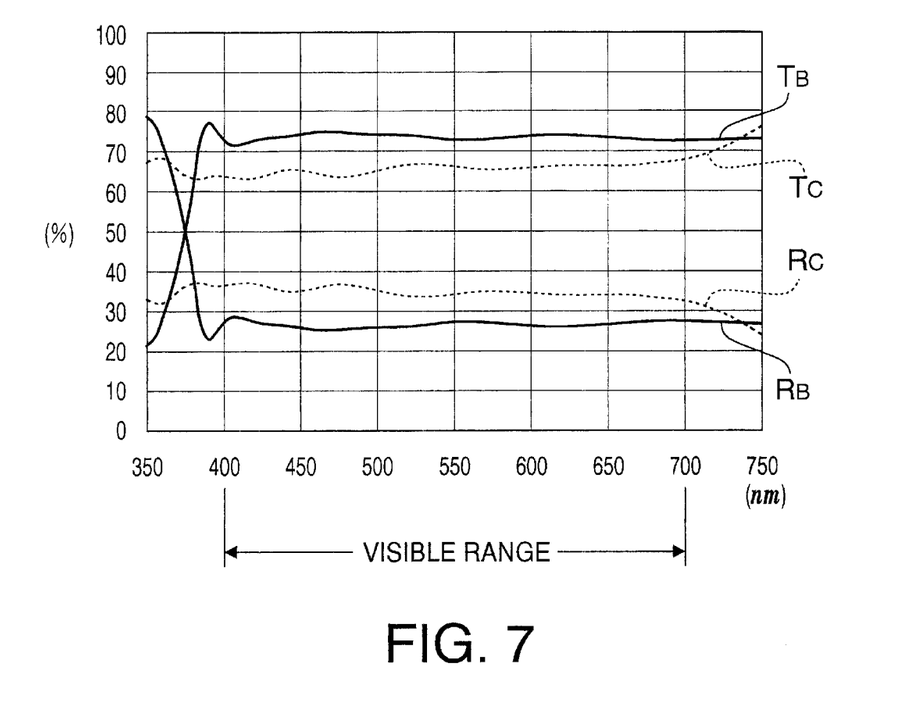
FIG. 7 shows a graph indicating a relationship between the reflectivity/transmissivity of the beam splitter employing the structure indicated in TABLE 2 with respect to the wavelength of the beams B and C.

FIG. 7 shows a graph indicating a relationship between the reflectivity/transmissivity of the beam splitter 2 employing the structure indicated in TABLE 2 with respect to the wavelength for the beams B and C. In FIG. 7, TB represents the transmissivity characteristic and RB represents the reflectivity characteristic of the beam B, TC represents the transmissivity characteristic and RC represents the reflectivity characteristic of the beam C. As shown in FIG. 7, according to the structure indicated in TABLE 2, the reflectivity/transmissivity for the beam B remain substantially constant (i.e., approximately 30%/70%) over a wavelength range of approximately from 380 nm to 750 nm, including the range (400 nm–700 nm) of the visible light. Further, the reflectivity/transmissivity for the beam C also remain substantially constant (i.e., approximately 30%/70%) over a wavelength range of approximately from 350 nm to 720 nm, including the range (400 nm–700 nm) of the visible light.

TABLE 3 indicates representative values obtained from FIGS. 6 and 7. Specifically, in TABLE 3, the reflectivities, reflection factors, transmissivities and transmission factors for the wavelengths of 400 nm, 550 nm and 700 nm are indicated with respect to the beams A, B and C. In TABLE 3, the reflection factor represents a ratio of a reflectivity with respect to the reflectivity for the wavelength of 550 nm, and the transmission factor represents a ratio of a transmissivity with respect to the transmissivity for the wavelength of 550 nm, to which wavelength (i.e., 550 nm) the human eye is considered to be most sensitive.

TABLE 3

| | 45° (beam A) | | |
|---|---|---|---|
| wavelength | 400 | 550 | 700 |
| reflectivity | 29% | 29% | 28% |
| reflection factor | 1.00 | 1.00 | 0.97 |
| transmissivity | 71% | 71% | 72% |
| transmission factor | 1.00 | 1.00 | 1.01 |
| | 35° (beam B) | | |
| wavelength | 400 | 550 | 700 |
| reflectivity | 28.10% | 28.15% | 27.95% |
| reflection factor | 1.00 | 1.00 | 0.99 |
| transmissivity | 71.90% | 71.85% | 72.05% |
| transmission factor | 1.00 | 1.00 | 1.00 |

TABLE 3-continued

| | 55° (beam C) | | |
|---|---|---|---|
| wavelength | 400 | 550 | 700 |
| reflectivity | 36.60% | 35.25% | 34.85% |
| reflection factor | 1.04 | 1.00 | 0.99 |
| transmissivity | 63.40% | 64.75% | 65.15% |
| transmission factor | 0.98 | 1.00 | 1.01 |

As indicated in TABLE 3, for each of the beams A, B and C (i.e., for each incident angle), a difference among the reflection factors (transmission factors) for wavelengths 400 nm, 550 nm, and 700 nm is 0.05 or less.

Generally, the human eye recognizes a difference in color of an image with respect to the actual object if the difference of the reflection factors (transmission factors) is approximately 0.1 or more. Since the difference is suppressed to 0.05 or less according to the structure indicated in TABLE 2, the value is within an allowable range.

It is known from TABLE 3 that the reflectivities of the beams A and B are lower than the designed value of 30% (i.e., the transmissivities are higher than the designed value of 70% by approximately 2%) by approximately 2%, due to the characteristics of the structure of the multi-layer film 23. Further, the reflectivities of the beam C are higher than the designed value by approximately 5%. Therefore, the brightness of the image is different depending on the portion of the image. However, although the human eye is sensitive to the hue as described above, it is not so sensitive to the variation of the brightness if the varied amount is less than approximately 10%. Thus, the above change (i.e., 2%–5%) is not recognized by human eye.

As described above, the beam splitter 2 having a structure indicated in TABLE 2 retains the reflectivity/transmissivity at substantially designed values over the wavelength of visible light regardless of the variation of the incident angle of the beam with respect to the inclined surface 21α of the prism 21. Therefore, both the image captured by the CCD 3 and the image observed through the finder optical system can be maintained at high quality.

It should be stressed that the structure indicated in TABLE 2 is only an exemplary structure and the invention is not limited to the values indicated therein. Various modification can be realized without departing from the scope of the invention.

Further, the structure of the multi-layer film indicated in TABLE 1 is an exemplary structure, and the invention is not limited to the structure. Even though the number and/or type of dielectric layers are changed, appropriate characteristics can still be obtained.

In the above-described embodiment, it is assumed that the beam A is incident on the surface 21α at the incident angle of 45°, and beams B and C are incident thereon at the incident angles of 35° and 55°, respectively. This range (i.e., 45°±10°) may be varied depending on the structure of the photographing system or the like. For example, the beams B and C may be assumed to be incident at the incident angles of 30° and 60°, respectively, on the surface 21α.

In the above-described embodiment, the beams splitter 2 is arranged such that the beam A is incident on the multi-layer film 23 at the incident angle of 45°. However, the invention is not limited to this configuration. For example, the beam splitter may be arranged such that the incident angle of the beam A with respect to the inclined surface 21α is 35°. In such a case, the multi-layer film is designed to have an appropriate characteristics for the beams whose incident angles are within a range of 25°–45°.

Still further, in the first embodiment, the designed reflectivity and transmissivity are 30% and 70%, respectively. These values are exemplary ones, and depending on the characteristics of the digital camera, CCD and the like, appropriate values may be determined.

Figure 8:
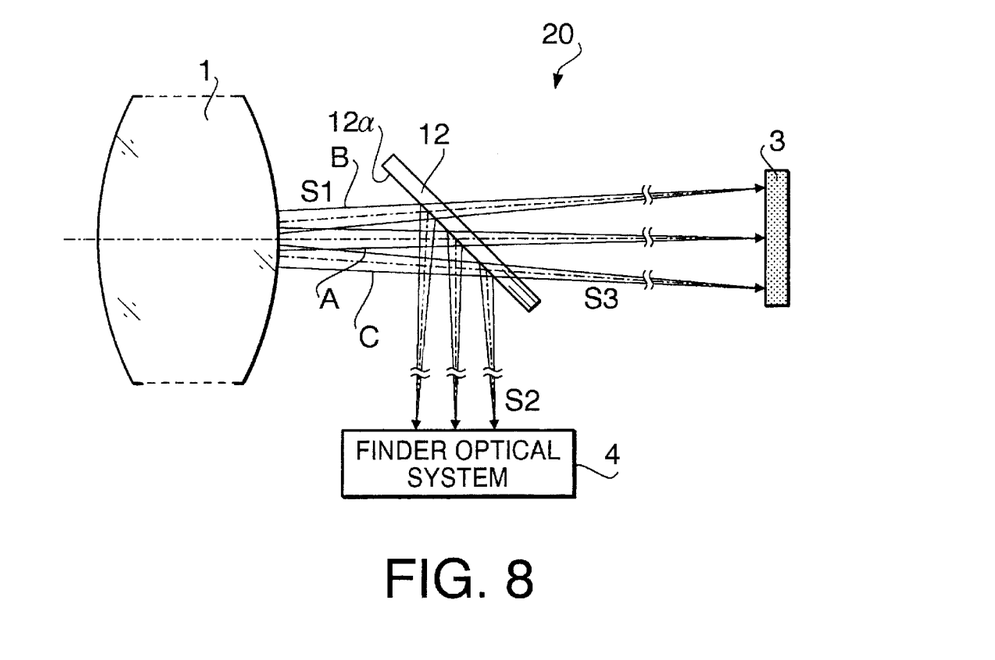
FIG. 8 schematically shows a photographing optical system employing a beam splitter according to a second embodiment of the invention.

FIG. 8 schematically shows a photographing optical system 20 employing a beam splitter 12 according to a second embodiment of the invention. In FIG. 8, to elements which are similar to those employed in the photographing optical system 10 shown in FIG. 3, the same reference numbers are assigned, and the detail description thereof will not be repeated.

The photographing optical system 20 includes a photographing lens 1, the beam splitter 12 and a CCD (Charge Coupled Device) 3.

Similarly to the photographing optical system 10 shown in FIG. 3, the light S1 passed through the photographing lens 1 is incident on the beam splitter 12, which splits the incident light S1 into light S2 reflected thereby and directed to a finder optical system 4, and light S3 impinges on the CCD 3. The CCD 3 converts the received optical image into an electric image signal, which is transmitted to an image processing circuit (not shown) of the camera.

Figure 9:
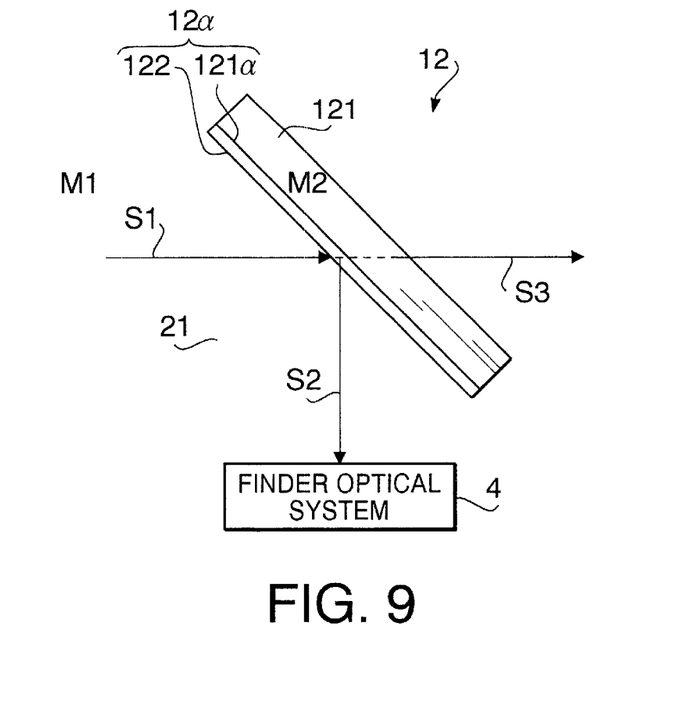
FIG. 9 is an enlarged plan view of the beam splitter employed in the photographing optical system shown in FIG. 8.

FIG. 9 is an enlarged plan view of the beam splitter 12. The beam splitter 12 is formed of a transparent parallel plate 121, and on a photographing lens side surface is formed as a half mirror surface 12α.

Specifically, the half mirror surface 12α has a multi-layer film 122 formed on the photographing lens side surface 121α of the parallel plate 121. Accordingly, the light S1 is incident on the beam splitter 12 from the air, and part of the incident light S1 passes through the multi-layer film 122 and the parallel plate 121 and is directed to the CCD 3 as the light S3, and the other part of the incident light S1 is reflected by the half mirror surface 12α and is directed to the finder optical system 4.

The multi-layer film 122 includes two or more dielectric materials. Specifically, the multi-layer film 122 is formed such that dielectric layer(s) having a relatively low refractive index and the dielectric layer(s) having a relatively high refractive index are alternately layered.

In FIG. 9, the thickness of the multi-layer film 122 is exaggerated for clarification, and the actual thickness thereof is much thinner than shown.

The beam splitter 12 is arranged such the optical axis of the photographing lens 1 and a normal line at a point where the optical axis of the photographing lens 1 intersects with the surface 121α form 45 degrees. With this structure, the beam splitter 12 splits the incident light S1 to the first and second light S2 and S3 at optimum rate.

It should be noted that the light S1 includes not only a component which is parallel with the optical axis of the photographing lens 1 but also components that are inclined with respect to the optical axis. In the following description, for representing such components, three beams A, B and C are described. The beam A is parallel with the optical axis of the photographing lens 1. The beam B is a beam that impinges on the surface 121α at the smallest incident angle (which is assumed to be 30 degrees in the second embodiment), and the beam C is a beam that impinges on the surface 21α at the greatest incident angle (which is assumed to be 60 degrees in the second embodiment). The beam A forms a central portion of the image, and the beams B and C form peripheral portions of the image on the CCD 3.

In the second embodiment, the multi-layer film 122 is designed such that the reflectivity and transmissivity of the visible light have substantially constant values over the wavelength range of the visible light. For example, the reflectivity is approximately 30%, and the transmissivity is approximately 70%.

Figure 10:
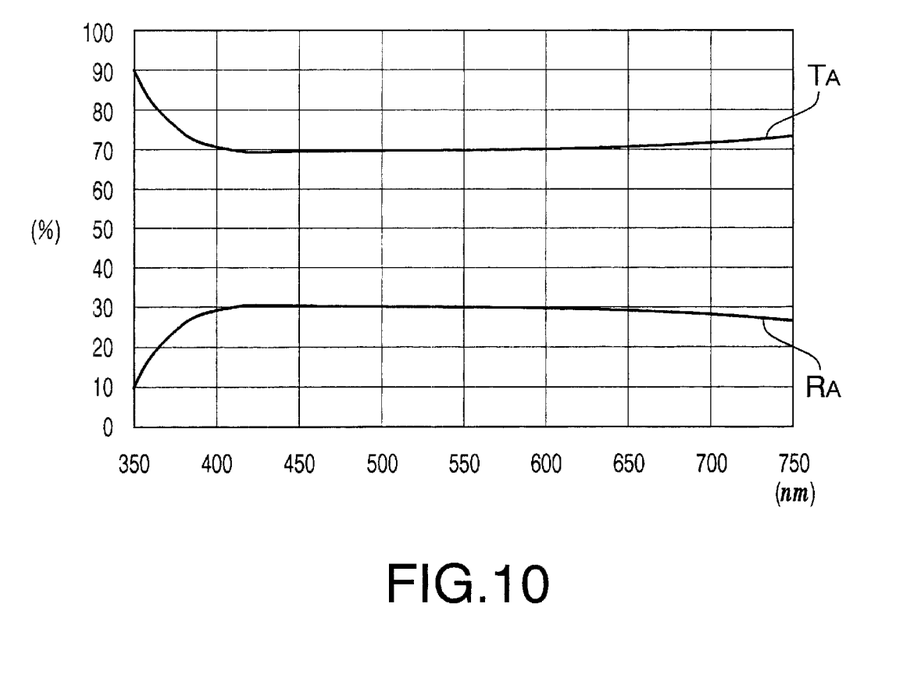
FIG. 10 schematically shows a graph indicating a relationship between the reflectivity of the beam splitter with respect to the wavelength of the beam A.

FIG. 10 schematically shows a graph indicating a relationship between the reflectivity of the beam splitter 12 with respect to the wavelength of the beam A. In FIG. 10, TA and RA represent the reflectivity and transmissivity characteristics for the beam A.

As shown in FIG. 10, the multi-layer film 122 exhibits a substantially constant reflectivity of approximately 30%, for the beam A, over the wavelength range of the visible light, and a substantially constant transmissivity of approximately 70% over the wavelength range of the visible light.

When the beam splitter having the characteristics shown in FIG. 10 is employed in the photographing optical system shown in FIG. 8, approximately 30% of the beam A is reflected by the beam splitter 12 and directed to the finder optical system 4, while approximately 70% of the beam A is incident on the CCD 3. Similarly to the first embodiment, the ratios are determined in view of the fact that the light directed to the finder optical system 4 is sufficient if it can be used for observing the object through the finder optical system 4, and the light directed to the CCD 3 is required to be used for capturing the image (i.e., obtaining the image signal).

Figure 11:
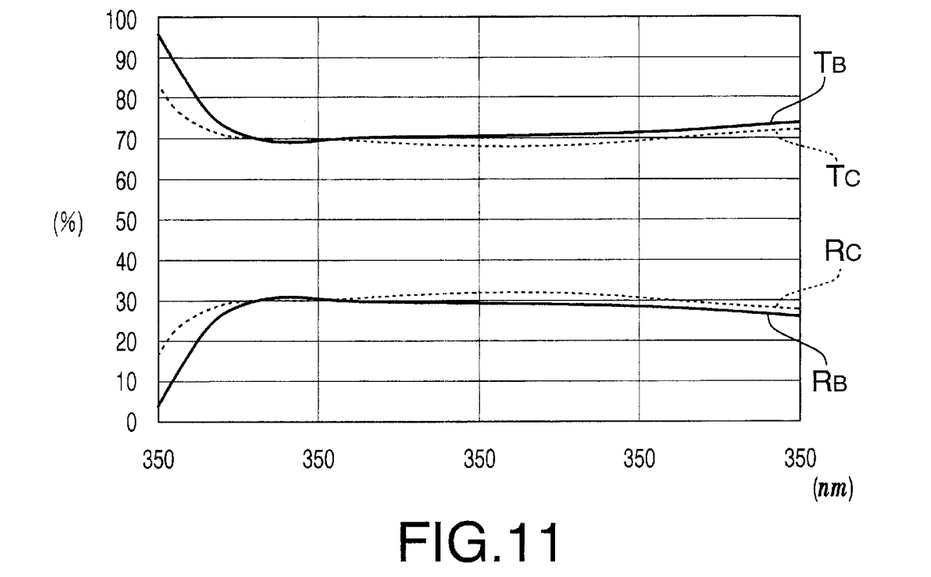
FIG. 11 shows a graph indicating a relationship between the reflectivity/transmissivity of the beam splitter with respect to the wavelength of the beams B and C.

FIG. 11 shows a graph indicating a relationship between the reflectivity/transmissivity of the beam splitter 12 with respect to the wavelength of the beams B and C. In FIG. 11, TB represents the transmissivity characteristic and RB represents the reflectivity characteristic of the beam B, and TC represents the transmissivity characteristic and RC represents the reflectivity characteristic of the beam C. As shown in FIG. 11, the reflectivities/transmissivities for the beams B and C remain substantially constant (i.e., approximately 30%/70%) over a wavelength range of the visible light.

TABLE 4 is a layer-structure of the multi-layer film 122.

TABLE 4

| layer | 1 | 2 | 3 | 4 | |
|---|---|---|---|---|---|
| material | M1 | H1 | L1 | H2 | L2 | M2 |

In TABLE 4, the upper row indicates a layer number in the order the beam impinges, and the lower row indicates the material of each layer. M1 represents the material (i.e., the air) from which the beam S1 is incident on the multi-layer film 122, and M2 represents the material (i.e., glass: material of the parallel plate 121) in which the beam S3 emerged from the multi-layer film 122 passes. If the refractive indexes of the material M1 and M2 are represented by $n_{M1}$ and $n_{M2}$, the following relationship should be satisfied.

$n_{M1} < n_{M2}$

Further, H1 and H2 represent dielectric materials having relatively high refractive indexes and L1 and L2 represent dielectric material having relatively low refractive indexes. The materials H1 and H2 need not be the same material, and the materials L1 and L2 need not be the same material. If the refractive indexes of the materials H1 and H2 are represented by $n_{H1}$ and $n_{H2}$, and the refractive indexes of the materials L1 and L2 are indicated by $n_{L1}$ and $n_{L2}$, the following relationships should be satisfied.

$1.90 < n_{H1} < 2.50$
$1.90 < n_{H2} < 2.50$
$1.30 < n_{L1} < 1.66$
$1.30 < n_{L2} < 1.66$

The thickness (QWOT: Quarter-Wave Optical Thickness) of each layer is defined by the following relationships.

566 nm<QWOT of H1<691 nm 314 nm<QWOT of L1<384 nm 71 nm<QWOT of H2<87 nm 308 nm<QWOT of L2<376 nm

TABLE 5 shows a concrete example satisfying the above relationships.

TABLE 5

| layer | material | index | absorption | QWOT |
|---|---|---|---|---|
| M1 | air | 1.000 | 0 | |
| H1 | TiO$_5$ | 2.347 | 0 | 628.36 |
| L1 | MgF$_2$ | 1.388 | 0 | 349.13 |
| H2 | TiO$_5$ | 2.347 | 0 | 79.37 |
| L2 | MgF$_2$ | 1.388 | 0 | 342.19 |
| M2 | glass | 1.518 | 0 | |

In the structure indicated in TABLE 5, titanium dioxide (TiO$_5$) is used, for the layers H1 and H2, as the dielectric material having the high refractive index. As the materials having the low refractive indexes, magnesium fluoride (MgF$_2$) is used for the layers L1 and L2. In this example, the absorption ratio of each layer is assumed to be zero.

As described above, the beam splitter 12 having a structure indicated in TABLE 5 retains the reflectivity/transmissivity at a substantially designed values over the wavelength of visible light regardless of the variation of the incident angle of the beam with respect to the surface 121α of the parallel plate 121. Therefore, both the image captured by the CCD 3 and the image observed through the finder optical system can be maintained at high quality.

It should be stressed that the structure indicated in TABLE 5 is only an exemplary structure and the invention is not limited to the values indicated therein. Various modification can be realized without departing from the scope of the invention.

Further, the structure of the multi-layer film indicated in TABLE 4 is an exemplary structure, and the invention is not limited to the structure. Even though the number and/or type of dielectric layers are changed, appropriate characteristics can still be obtained.

In the above-described embodiment, the beams splitter 12 is arranged such that the beam A is incident on the multi-layer film 122 at the incident angle of 45°. However, the invention is not limited to this configuration. For example, the beam splitter 12 may by arranged such that the incident angle of the beam A with respect to the surface 21α is 35°. In such a case, the multi-layer film is designed to have an appropriate characteristics for the beams whose incident angles are within a range of 20°–50°.

Still further, in the second embodiment, the designed reflectivity and transmissivity are 30% and 70%, respectively. These values are exemplary ones, and depending on the characteristics of the digital camera, CCD and the like, appropriate values may be determined.

In the second embodiment, the light is incident on the multi-layer film 122 from the air, and emerged therefrom into the parallel plate 121. In order to reduce the number of the layers included in the multi-layer film 122, the parallel plate 121 which has a greater refractive index than the air is located on the light emerging side of the multi-layer film 122. In the embodiment, the parallel plate 121 is made of glass. However, the invention is not limited to this structure, and the parallel plate may be made of another material. Further, the parallel plate may be replaced with another optical element having a different shape, and having the refractive index greater than that of the air.

Figure 12:
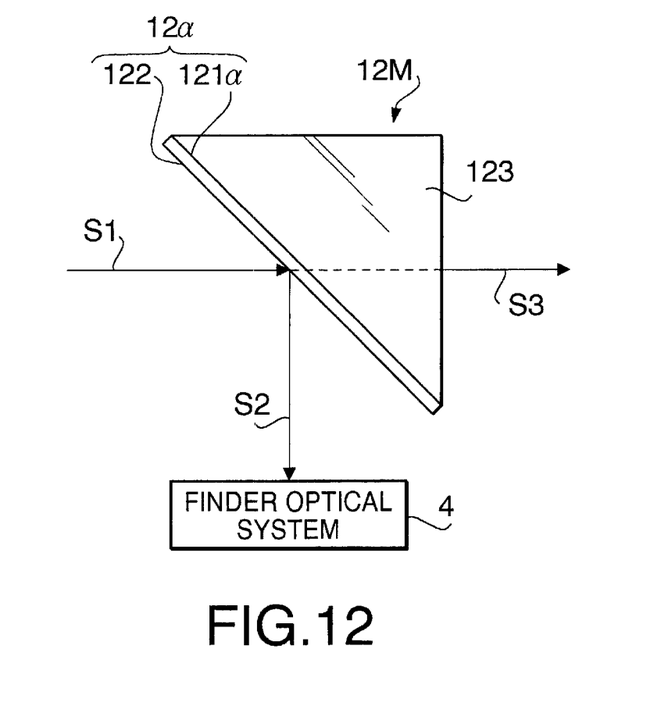
FIG. 12 shows a modification of the beam splitter which replaces the beam splitter shown in FIG. 8.

FIG. 12 shows a modification of the beam splitter 12M which replaces the beam splitter 12 in FIG. 8. In this modification, the parallel plate 121 of the beam splitter 12 shown in FIG. 9 is replaced with a right-angle prism 123. Employing the right-angle prism 123 is advantageous in that the position of the beam splitter 12M can easily be adjusted making use of the surfaces of the prism 123.

The present disclosure relates to the subject matters contained in Japanese Patent Applications Nos. 2000-021037 and 2000-021038, both filed on Jan. 31, 2000, which are expressly incorporated herein by reference in their entireties.

What is claimed is:

1. A beam splitter for a digital camera for capturing an image of an object using an image capturing element, said beam splitter splitting light passed through a photographing lens of said camera into a beam directed to said image capturing element and a beam directed to a finder optical system of said camera, said beam splitter comprising:

at least one optical element provided with a beam splitting surface that is inclined with respect to an optical axis of said photographing lens;

a multi-layer film formed on said beam splitting surface, said multi-layer film including a plurality of layers of dielectric materials, wherein said at least one optical element comprises first and second right-angle prisms, inclined surfaces of said first and second prisms being adhered to each other with said multi-layer film sandwiched therebetween, the inclined surface of said second prism being said beam splitting surface, wherein said multi-layer film is formed such that said beam splitting surface exhibits a substantially constant reflectivity for light whose wavelength is within a range broader than one wavelength range of the visible light in both a lower wavelength direction and a higher wavelength direction, and which light is incident on said beam splitting surface at a predetermined incident angle, wherein said multi-layer film includes at least two types of dielectric layers respectively having a relatively low refractive index and a relatively high refractive index, said two type of dielectric layers being alternately layered, wherein said low refractive index is within a range from 1.30 to 1.66, and wherein said high refractive index is within a range from 1.90 to 2.50, wherein said multi-layer film includes six layers L1–L6 respectively having the low refractive indexes and seven layers H1–H7 respectively having the high refractive indexes;

wherein said layers L1–L6 and H1–H7 are arranged, from the light incident side, in the order of H1, L1, H2, L2, H3, L3, H4, L4, H5, L5, H6, L6 and H7; and wherein a quarter-wavelength optical thickness (QWOT) of each of said layers H1–H7 and L1–L6 is defined as follows:

143 nm<QWOT of H1<175 nm;

172 nm<QWOT of L1<211 nm;

1304 nm<QWOT of H2<1594 nm;

182 nm<QWOT of L2<223 nm;

204 nm<QWOT of H3<249 nm;

463 nm<QWOT of L3<565 nm;

928 nm<QWOT of H4<1134 nm;

450 nm<QWOT of L4<550 nm;
835 nm<QWOT of H5<1021 nm;
464 nm<QWOT of L5<567 nm;
498 nm<QWOT of H6<609 nm;
179 nm<QWOT of L6<218 nm; and
480 nm<QWOT of H7<586 nm.

2. The beam splitter according to claim 1, wherein said predetermined range is a range of ±15 degrees with respect to a predetermined angle.

3. The beam splitter according to claim 2, wherein said predetermined angle is 45 degrees.

4. A beam splitter for a digital camera for capturing an image of an object using an image capturing element, said beam splitter splitting light passed through a photographing lens of said camera into a beam directed to said image capturing element and a beam directed to a finder optical system of said camera, comprising:

at least one optical element provided with a beam splitting surface that is inclined with respect to an optical axis of said photographing lens;

a multi-layer film formed on said beam splitting surface, said multi-layer film including a plurality of layers of dielectric materials, said multi-layer film being formed such that said beam splitting surface of said at least one optical element exhibits a substantially constant reflectivity at least for visible light that is incident on said beam splitting surface at any incident angle within a predetermined range, wherein said multi-layer film is arranged on the photographing lens side of said at least one optical element, the photographing lens side of said multi-layer film being exposed to a predetermined medium having a refractive index lower than that of said at least one optical element, wherein said multi-layer film includes at least two types of dielectric layers respectively having a relatively low refractive index and a relatively high refractive index, said two types of dielectric layers being alternately layered;

wherein said low refractive index is within a range from 1.30 to 1.66, and wherein said high refractive index is within a range from 1.90 to 2.50, wherein said multi-layer film includes two layers L1 and L2 respectively having the low refractive indexes and two layers H1 and H2 respectively having the high refractive indexes, said layers H1, L1, H2 and L2 being arranged, in this order, from the light incident side; and wherein a quarter-wavelength optical thickness (QWOT) of each layers H1, H2, L1 and L2 are defined as follows:
566 nm<QWOT of H1<691 nm;
314 nm<QWOT of L1<384 nm;
71 nm<QWOT of H2<87 nm; and
308 nm<QWOT of L2<376 nm.

5. The beam splitter according to claim 4, wherein said at least one optical element consists of a single glass optical element, and wherein said predetermined medium is air.

6. The beam splitter according to claim 5, wherein said single element is a parallel plate.

7. The beam splitter according to claim 5, wherein said single element is a right-angle prism, said beam splitting surface being provided on an inclined surface of said right-angle prism.

* * * * *